(12) United States Patent
Alvarez et al.

(10) Patent No.: US 8,149,911 B1
(45) Date of Patent: Apr. 3, 2012

(54) METHOD AND/OR APPARATUS FOR MULTIPLE PASS DIGITAL IMAGE STABILIZATION

(75) Inventors: José R. Alvarez, Sunnyvale, CA (US); Guy Cote, San Jose, CA (US); Udit Budhia, Mountain View, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 1448 days.

(21) Appl. No.: 11/675,715

(22) Filed: Feb. 16, 2007

(51) Int. Cl.
   *H04N 7/12* (2006.01)
(52) U.S. Cl. .............................. 375/240.12; 375/240.16
(58) Field of Classification Search ............. 375/240.12, 375/240.16
   See application file for complete search history.

(56) References Cited

U.S. PATENT DOCUMENTS

| | | | | |
|---|---|---|---|---|
| 5,999,651 | A * | 12/1999 | Chang et al. ................... | 382/215 |
| 6,084,912 | A * | 7/2000 | Reitmeier et al. ........ | 375/240.11 |
| 6,628,711 | B1 * | 9/2003 | Mathew et al. .......... | 375/240.12 |
| 6,809,758 | B1 * | 10/2004 | Jones ....................... | 348/208.99 |
| 6,968,009 | B1 * | 11/2005 | Straasheijm ............. | 375/240.16 |
| 7,408,986 | B2 * | 8/2008 | Winder ..................... | 375/240.12 |
| 2002/0118761 | A1 * | 8/2002 | Lee ........................... | 375/240.27 |
| 2004/0120197 | A1 * | 6/2004 | Kondo et al. ................ | 365/202 |
| 2006/0017814 | A1 * | 1/2006 | Pinto et al. ................. | 348/208.4 |
| 2006/0023790 | A1 * | 2/2006 | Tsai et al. ................. | 375/240.16 |
| 2006/0159311 | A1 * | 7/2006 | Bober et al. .................. | 382/107 |
| 2006/0188021 | A1 * | 8/2006 | Suzuki et al. ............ | 375/240.16 |
| 2006/0206292 | A1 * | 9/2006 | Ali ..................................... | 703/2 |
| 2006/0228049 | A1 * | 10/2006 | Gensolen et al. ............. | 382/309 |
| 2006/0257042 | A1 * | 11/2006 | Ofek et al. ..................... | 382/255 |
| 2006/0290821 | A1 * | 12/2006 | Soupliotis et al. ............ | 348/701 |
| 2007/0076982 | A1 * | 4/2007 | Petrescu ....................... | 382/294 |
| 2007/0092111 | A1 * | 4/2007 | Wittebrood et al. .......... | 382/107 |
| 2007/0154066 | A1 * | 7/2007 | Lin et al. ....................... | 382/103 |
| 2008/0004073 | A1 * | 1/2008 | John et al. .................. | 455/556.1 |
| 2008/0030586 | A1 * | 2/2008 | Helbing et al. ............ | 348/208.4 |

FOREIGN PATENT DOCUMENTS

JP            11266459 A   *   9/1999

OTHER PUBLICATIONS

Dietmar Wueller, "Evaluating Digital Cameras", SPIE-IS&T/vol. 6069 60690K-1, 2006, 15 pages.

Kenya Uomori et al., "Automatic Image Stabilizing System by Full-Digital Signal Processing", IEEE Transactions on Consumer Electronics, vol. 36, No. 3, Aug. 1990, pp. 510-519.

(Continued)

*Primary Examiner* — Michael Pyzocha
(74) *Attorney, Agent, or Firm* — North Weber & Baugh LLP

(57) ABSTRACT

An apparatus including a first circuit and a second circuit. The first circuit may be configured to generate (i) a first series of sequential frames, (ii) a plurality of local motion vectors for each of said frames, (iii) one or more global motion vectors for each of said frames, (iv) a second series of stabilized sequential frames, (v) a plurality of rough motion vectors and (vi) a digital bitstream in response to (i) a video input signal. The second circuit may be configured to store (i) the first series of sequential frames, (ii) the plurality of local motion vectors, (iii) the one or more global motion vectors, (iv) the second series of stabilized sequential frames and (v) the plurality of rough motion vectors.

23 Claims, 6 Drawing Sheets

OTHER PUBLICATIONS

Jie Shao et al., "Simultaneous Background And Foreground Modeling For Tracking In Surveillance Video", IEEE, 2004, pp. 1053-1056.

A.J. Crawford, et al., "Gradient Based Dominant Motion Estimation With Integral Projections For Real Time Video Stabilisation", IEEE, 2004, pp. 3371-3374.

Marius Tico et al., "Constraint Motion Filtering for Video Stabilization", IEEE, 2005, pp. III-569 through III-572.

Ikuko Tsubaki et al., "An Adaptive Video Stabilization Method For Reducing Visually Induced Motion Sickness", IEEE, 2005, pp. III-497 through III-500.

Filippo Vella et al., "Digital Image Stabilization by Adaptive Block Motion Vectors Filtering", IEEE Transactions on Consumer Electronics, vol. 48, No. 3, Aug. 2002, pp. 796-801.

Yu-Chun Peng et al., "Digital Image Stabilization and Its Integration With Video Encoder", IEEE, 2004, pp. 544-549.

Haruhisa Okuda et al., "Optimum Motion Estimation Algorithm for Fast and Robust Digital Image Stabilization", IEEE Transactions on Consumer Electronics, vol. 52, No. 1, Feb. 2006, pp. 276-280.

* cited by examiner

METHOD AND/OR APPARATUS FOR MULTIPLE PASS DIGITAL IMAGE STABILIZATION

FIELD OF THE INVENTION

The present invention relates to video processing generally and, more particularly, to a method and/or apparatus for implementing a multiple pass digital image stabilization system.

BACKGROUND OF THE INVENTION

As camcorders and other video recording devices (i.e., digital still cameras, mobile phones, etc.) continue to shrink in size, and as zoom ratios continue to increase, it becomes increasingly difficult for users to steadily hold a camera to produce stable video.

Camera ergonomics may not allow holding the device in a stable and comfortable position and thus promote unstable holding of the device. Also, because of the highly mobile nature of these devices, people are increasingly capturing video in less than ideal situations (i.e., outdoor activities, sporting events, etc.) as opposed to contrived in-door events. Therefore, there is less opportunity for properly supporting the camera during recording.

Furthermore, as optics continue to improve, magnification capabilities are often incorporated in such devices. High magnification factors (i.e., zooming) contribute to the unstable appearance of video since such zooming amplifies every small movement of the hand of the user.

Camera jitter (i.e., mechanical instability) introduces extraneous motion during video capture. The extraneous motion is not related to the actual motion of objects in the picture. Therefore, the motion appears as random picture movements that produce disturbing visual effects. The motion can be difficult to encode at low bit rates. The end result is video material that is hardly usable from both practical and aesthetic perspectives.

Camcorder manufacturers have implemented various ways of implementing image stabilization. One way is to use mechanical correction, including piezo-electric physical displacement, optical system fluid coupling/dampening and other mechanical dampening devices. Another way of solving the problem is by electronic correction (i.e., digital signal processing) using external sensors.

Current digital image stabilization solutions are limited by the type of processors used in typical cameras. These processors are more geared toward Image/Sensor Processing and therefore do not have easy access to the sophisticated motion estimation statistics commonly available in hybrid entropy video encoder/decoders (Codecs). Furthermore, in cases when a digital stabilization is used in the context of a video Codec, a large number of motion vectors are used in a single pass without a flexible selection of areas of motion and in a non-hierarchical motion estimation architecture.

It would be desirable to remove extraneous motion from an input video signal to produce a stabilized sequence of pictures that is more visually pleasing and/or more easily compressed.

SUMMARY OF THE INVENTION

The present invention concerns an apparatus including a first circuit and a second circuit. The first circuit may be configured to generate (i) a first series of sequential frames, (ii) a plurality of local motion vectors for each of said frames, (iii) one or more global motion vectors for each of said frames, (iv) a second series of stabilized sequential frames, (v) a plurality of rough motion vectors and (vi) a digital bitstream in response to (i) a video input signal. The second circuit may be configured to store (i) the first series of sequential frames, (ii) the plurality of local motion vectors, (iii) the one or more global motion vectors, (iv) the second series of stabilized sequential frames and (v) the plurality of rough motion vectors.

The objects, features and advantages of the present invention include providing a method and/or apparatus for implementing a digital image stabilization system that may (i) use available pre-processing structures (e.g., cropping, polyphase scaling, statistics gathering, feature classification regions, etc.), (ii) allow flexibility in using external overscan sensors such that the order of cropping and scaling during motion compensation may be reversed (or to allow scaling to be bypassed completely), (iii) implement a hierarchical motion estimation architecture that allows localized sets of motion vectors to be flexibly defined at any spatial location in a picture, (iv) implement pre-motion estimation that may be performed in the subsampled picture domain in order to increase motion detection range, (v) implement full-pel accurate motion vectors, (vi) achieve sub-pel global compensation through a scaling process, (vii) allow multiple pass analysis and detection of the image sequence to improve quality in an analogous manner as dual-pass rate control, (viii) reduce the data set of local motion vectors to simplify global motion vector computations, (ix) allow picture sequence adaptivity by analyzing statistical data gathered on both processing paths, (x) provide adaptivity that may be achieved for local motion as well as global motion by time-series processing of resulting stabilization data, (xi) allow encoding statistics to be used in determination of best quality in multiple encoding passes (e.g., does not preclude the use of multiple fast encodings and multiple stabilization enhancements) and/or (xii) provide stabilization by implementing multiple (e.g., recursive) processing passes.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention relates to providing a system that may be used to stabilize captured images in order to improve visual quality and/or the amount of compression. The present invention may use one or more digital image stabilization (DIS) techniques. In one example implementation, digital signal processing (DSP) may be used to estimate and compensate for random jitter introduced by the movement of a camera (or other capture device) during operation.

Figure 1:
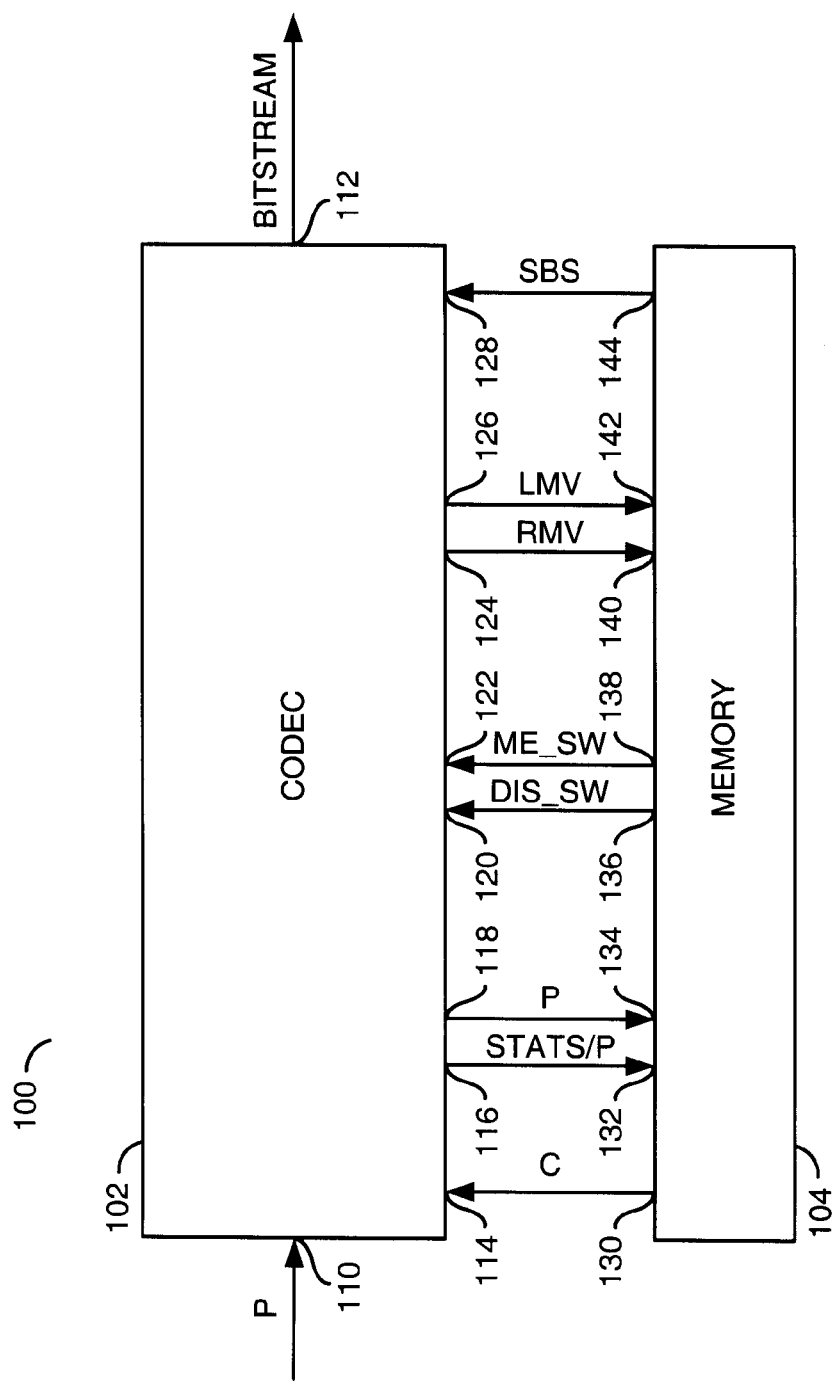
FIG. 1 is a block diagram illustrating a digital image stabilization (DIS) system in accordance with the present invention.

Referring to FIG. 1, a block diagram of a system 100 is shown in accordance with the present invention. The system 100 generally comprises a block (or circuit) 102 and a block (or circuit) 104. The block 102 may be implemented as a coder/decoder, or compressor/decompressor, (CODEC) circuit. The block 104 may be implemented as a storage device or medium (e.g., memory, etc.). In one example, the block 104 may be implemented as a random access memory (RAM). However, other types of memory (e.g., double data rate (DDR), synchronous dynamic random access memory (SDRAM), etc.) may be implemented accordingly to meet the design criteria of a particular implementation. The system 100 may be implemented in hardware, software or a combination of hardware and software according to the teachings of the present disclosure, as would be apparent to those skilled in the relevant art(s).

The block 102 may have an input 110 that may receive a signal (e.g., P) and an output 112 that may present a signal (e.g., BITSTREAM). The signal P generally represents an unencoded video input signal. In one example, the signal P may be received from an imaging sensor, or other capture device. The signal BITSTREAM generally represents an encoded digital bitstream. The signal BITSTREAM may be implemented, in one example, as a compressed bitstream. The signal BITSTREAM may be compliant with one or more standard or proprietary encoding/compression specifications.

In one example, the block 102 may have an input 114 that may receive a signal (e.g., C), an output 116 that may present a signal (e.g., STATS), an output 118 that may present the signal P, an input 120 that may receive a signal (e.g., DIS_SW), an input 122 that may receive a signal (e.g., ME_SW), an output 124 that may present a signal (e.g., RMV), an output 126 that may present a signal (e.g., LMV) and an input 128 that may receive a signal (e.g., SBS). In one example, the memory 104 may have an output 130 that may present the signal C, an input 132 that may receive the signal STATS/P, an input 134 that may receive the signal P, an output 136 that may present the signal DIS_SW, an output 138 that may present the signal ME_SW, an input 140 that may receive the signal RMV, an input 142 that may receive the signal LMV and an output 144 that may present the signal SBS. The signal C may comprise one or more cropped images (or pictures). The signal STATS/P may comprise stabilized picture and statistics information. The signal P may comprise unstable (e.g., jittery) input video information. The video information in the signal P may be full resolution (e.g., capture resolution). The signal DIS_SW may comprise search window information (e.g., location, search ranges, number of search areas and any other parameters specified by the digital image stabilization technique implemented by the circuit 102). The signal ME_SW may comprise information that may be used in perform a motion estimation process compliant with an encoding process implemented by the circuit 102. The signal RMV may comprise rough motion vector information. The signal LMV may comprise local motion vector information. The signal SBS may comprise stabilized picture and statistics information that may be used by the encoding process implemented by the circuit 102.

The inputs, outputs and signals shown coupling the block 102 and the block 104 generally represent logical inputs, logical outputs and logical data flows. The logical data flows are generally illustrated as signals communicated between respective the inputs and outputs for clarity. As would be apparent to those skilled in the relevant art(s), the inputs, outputs, and signals illustrated in FIG. 1 (and also in FIG. 2) representing the logical data flows are generally representative of physical data transferred between the respective blocks by, for example, address, data, and control signals and/or busses. Although the logical data flows are shown together for completeness, as would be apparent to those skilled in the relevant art(s) individual data flows may occur simultaneously or separately from one another depending upon the design criteria of a particular implementation.

Figure 2:
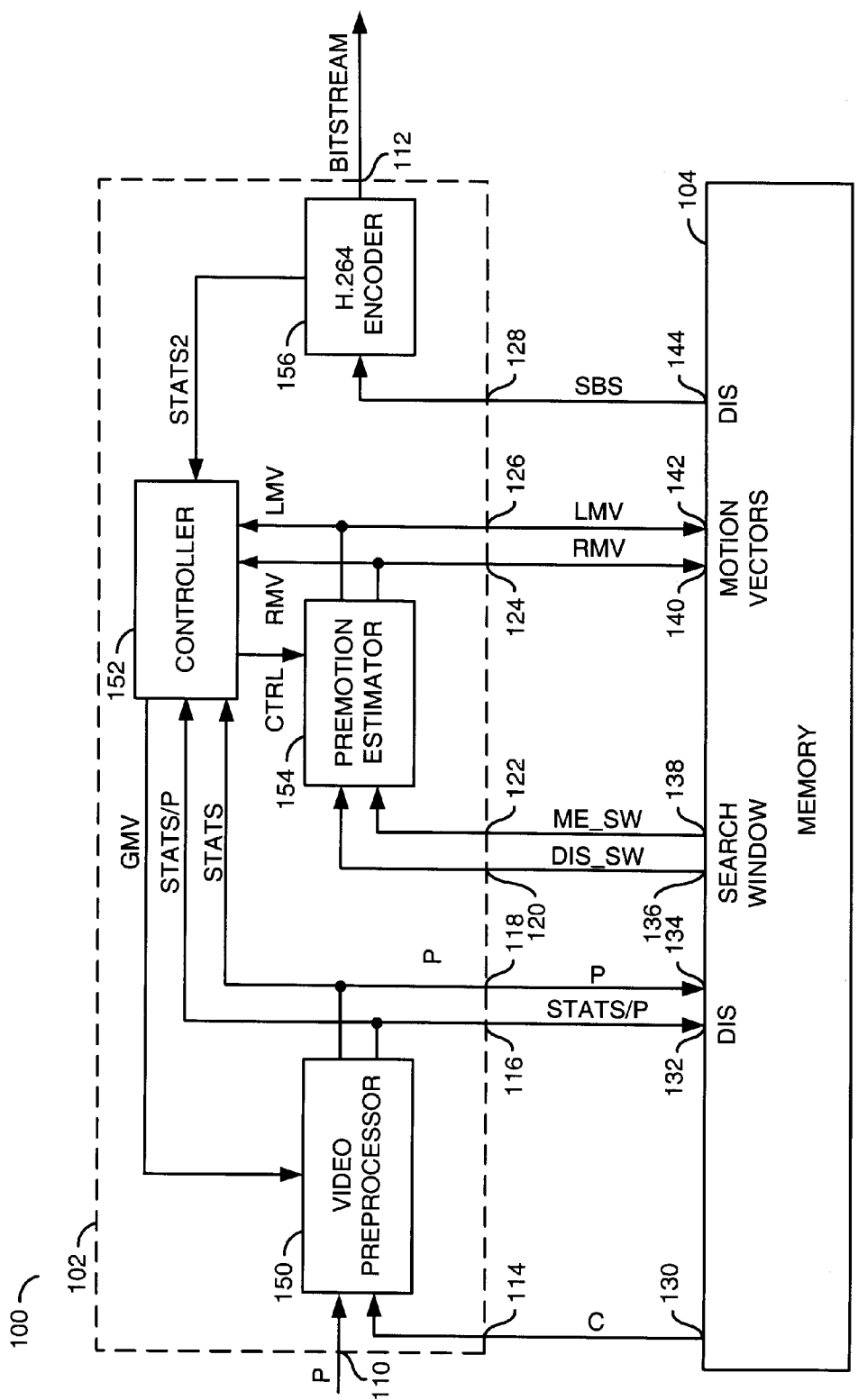
FIG. 2 is a more detailed diagram illustrating an implementation of the digital image stabilization (DIS) system of FIG. 1 in accordance with a preferred embodiment of the present invention.

Referring to FIG. 2, a diagram is shown illustrating an example implementation of the system 100 in accordance with a preferred embodiment of the present invention. The circuit 102 may comprise a block (or circuit) 150, a block (or circuit) 152, a block (or circuit) 154 and a block (or circuit) 156. The circuit 150 may be implemented as a video preprocessor circuit. The circuit 152 may be implemented as a controller circuit. The circuit 154 may be implemented as a premotion estimator circuit. The circuit 156 may be implemented, in one example, as an H.264 encoder circuit. However, other encoders may be implemented to meet the design criteria of a particular implementation. Although the circuit 156 is shown integrated with the circuit 102, the circuit 156 may be implemented separately from the circuit 102.

The circuit 150 may receive a signal (e.g., GMV), the signal P and the signal C. The circuit 150 may generate a signal (e.g., STATS), the signal P and the signal STATS/P in response to the signals GMV, P and C. The circuit 152 may receive a signal (e.g., STATS2) and the signals STATS, STATS/P, RMV and LMV. The circuit 152 may generate a signal (e.g. CTRL) and the signal GMV in response to the signals STATS, STATS2, STATS/P, RMV and LMV. The circuit 154 may receive the signals CTRL, DIS_SW and ME_SW. The circuit 154 may generate the signals RMV and LMV in response to the signals CTRL, DIS_SW and ME_SW. The circuit 156 may receive the signal SBS. The circuit 156 may generate the signal BITSTREAM and the signal STATS2 in response to the signal SBS.

The system 100 may process the input video data signal P in two stages. The unstable (jittery) input video signal P may be passed through the video preprocessor circuit 150 at full resolution to capture the signal P as a sequence of video pictures. The video preprocessor circuit 150 may generate statistics for the unstable input video signal P that may be communicated (e.g., via the signal STATS) to the controller 152 for analysis. The analysis may include, for example, scene detection and sudden event detection. Pictures containing unstable portions of the input video signal P may be stored in the memory 104 (e.g., via the signal P) for further processing.

The premotion estimator circuit 154 may receive the location, search ranges, number of areas and other parameters from the memory 104 (e.g., via the signal DIS_SW) and the controller 152 (e.g., via the signal CTRL) based on indications (or instructions) from the firmware (or software) executed by the controller 152. The premotion estimator circuit 154 may use the location, search ranges, number of areas and other parameters indicated by the firmware executed by the controller 152 to compute and transmit raw local motion vectors. The raw local motion vectors may be computed for a specific block or set of blocks in the picture being processed. The raw local motion vectors may be presented to the memory 104 and the controller 152 via the signal LMV. Further processing of the raw local motion vectors may produce the GMV that eventually is used to compensate (stabilize) the picture.

The controller 152 analyses the signal STATS and the local motion vectors (LMVs) for a respective picture to produce a global motion vector (GMV) and other control information for motion compensation (stabilization) of the respective picture. The video preprocessor 150 receives the global motion vector and other control information for motion compensation (stabilization) of the respective picture via the signal GMV and retrieves one or more cropped pictures from a displaced location in the memory 104. The displaced location for retrieving the cropped picture(s) is generally indicated by the global motion vector(s) received from the controller 152. In one example, the video preprocessor circuit 150 may perform scaling with sub-phase accuracy (e.g., using a multiple phase scaler) to produce a sub-pel displacement (stabilization). The video preprocessor circuit 150 writes the stabilized picture(s) and statistics to the memory 104 and the controller 152 (e.g., via the signal STATS/P).

The premotion estimator circuit 154 retrieves information from the memory 104 (e.g., via the signal ME_SW) for performing a pre-motion estimation process. The pre-motion estimation process may be performed in the normal hierarchical motion estimation process which is normally part of the encoder process (e.g., H.264, etc.) implemented by the system 100. The premotion estimator circuit 154 writes search area rough motion vectors (RMV) to the memory 104 and the controller 152 (e.g., via the signal RMV). The rough motion vectors may be used by the encoder 156 for further motion estimation refinement.

The encoder 156 uses the stabilized picture and statistics information retrieved from the memory 104 (e.g., via the signal SBS) to code pictures with the best quality. The encoder 156 produces encoded bitrate and compression statistics that are communicated to the controller 152 (e.g., via the signal STATS2). The encoded bitrate and compression statistics may be used for further refinements to the digital image stabilization process.

The system 100 may provide digital image stabilization (DIS) using digital information extracted from the input video signal P. The system 100 may perform sub-pel accurate DIS through the video preprocessor circuit 150, the premotion estimator circuit 152 and a method (or process) running on the controller 152. The controller 152 may be implemented as a programmable processor. The system 100 may generate a global motion vector (GMV) for each picture obtained through the stabilization process. In one example, the digital stabilization process may be implemented in software or firmware. For example, the digital stabilization process may be implemented and/or controlled using computer executable instructions stored in a computer readable medium.

The video preprocessor circuit 150 and the premotion estimator circuit 154 may be used during encoding operations. The video preprocessor circuit 150 and the premotion estimator circuit 154 may also be used in parallel under firmware control to compute the global motion vectors 210a-210n and/or to perform global image displacement for improved coding.

The actual global displacement indicated by the global motion vector GMV may use sub-pel accuracy. In order to perform sub-pel accurate displacement two mechanisms may be implemented. The first one comprises reading an offset location from memory. For example, if the original picture is stored at location x,y in the memory 104, a GMV (global motion vector) may be generated that indicates the image should be read from location (x+n, y+m), where the n,m value is the two-dimensional displacement. If the actual displacement computed turns out to be a fractional number (e.g., a non-integer pixel displacement) the non-integer part of the displacement may be computed by interpolation using a polyphase filter.

Figure 3:
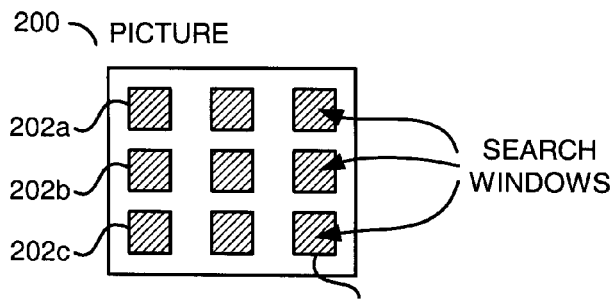
FIG. 3 is a diagram illustrating partitioning of an image.

Referring to FIG. 3, a diagram is shown illustrating partitioning of an image 200 into a number of search windows. The image 200 may be one frame generated from the input signal P. A number of search windows 202a-202n may be defined in the frame 200. Each of the search windows 202a-202n may be separately analyzed (e.g., as described below in connection with FIGS. 4 and 5). FIG. 3 generally illustrates an implementation with nine search windows 202a-202n. However, the particular number of search windows in each picture 200 may be varied to meet the design criteria of a particular implementation. The number and/or position of each of the search windows 202a-202n may be varied to meet the design criteria of a particular implementation. In one example, the number and/or position of each of the search windows 202a-202n may be varied dynamically. The number and/or position of each of the search windows 202a-202n may be programmable.

Figure 4:
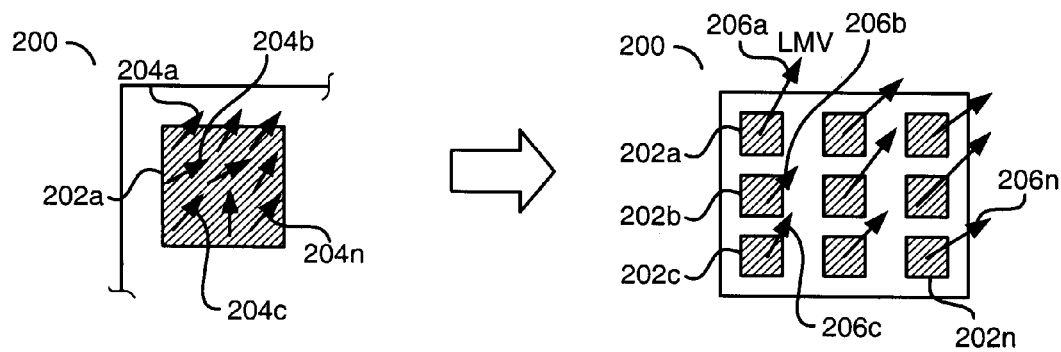
FIG. 4 is a diagram illustrating computation of local motion vectors.

Referring to FIG. 4, a diagram is shown illustrating computation of local motion vectors for the search windows 202a-202n of FIG. 3. The premotion estimation circuit 154 computes a local motion vector (e.g., LMV) for each of the search windows 202a-202n based upon a cluster motion vectors 204a-204n for each of the search windows 202a-202n. Each search window 202a-202n generally has a corresponding local motion vector 206a-206n. The premotion estimation circuit 154 generally searches the particular search window 202a-202n in a previous picture to find the best match. The computation may use information that is part of the normal motion estimation process in a typical encoder data path.

Each local motion vector (LMV) 206a-206n may be the result of the plurality of motion vectors 204a-204n derived from adjacent blocks (e.g., macroblocks) in the respective search windows 202a-202n. In one example, a single LMV 206 may be derived for each local cluster of motion vectors 204a-204n. The single LMV 206 may be used for further processing. In a preferred embodiment, a recursive method may be used to derive the local and global vectors (described below in connection with FIGS. 9-11).

Figure 5:
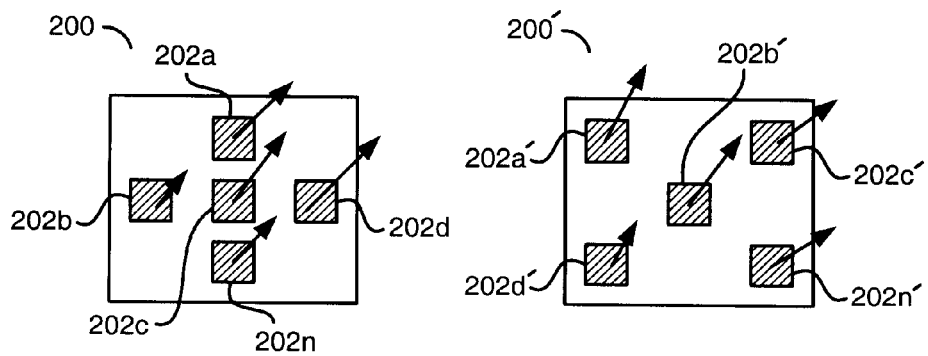
FIGS. 5(A-B) are diagrams illustrating manipulation of search windows.

Referring to FIGS. 5(A-B), diagrams are shown illustrating an example manipulation of the search windows 202a-202n. The number, location and size of the search windows 202a-202n in each picture may be changed according to particular criteria determined by the stabilization process implemented in the system 100. The criteria may include, but are not limited to, (i) statistical analysis using video preprocessor (VPP) data (e.g., motion in static areas, high frequency content, etc.), (ii) clustering of pre-motion vectors using pre-motion estimation results, and/or (iii) fidelity of encoding using encoder statistics. In one example, the number of search windows 202a-202n may be located according to a first layout (FIG. 5A). In another example, a number of search windows 202a'-202n' may be located according to a second layout (e.g., the picture 200' in FIG. 5B). The particular grouping of the search windows 202a-202n and/or 202a'-202n' may be varied to meet the design criteria of a particular implementation.

Figure 6:
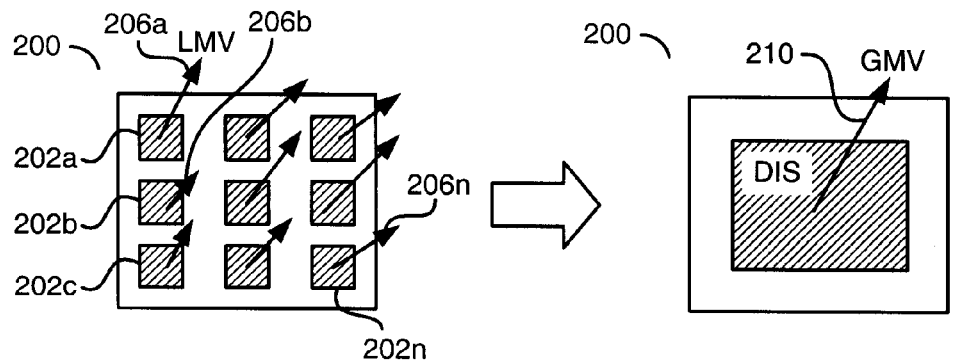
FIG. 6 is a diagram illustrating generation of a global motion vector.

Referring to FIG. 6, a diagram illustrating a global motion vector (GMV) 210 is shown. In general, as each picture 200 in a particular sequence of pictures is stabilized, a respective global motion vector 210 may be generated using the plurality of local motion vectors 206a-206n for the picture 200. In general, one global motion vector 210 is generated for each picture 200.

Figure 7:
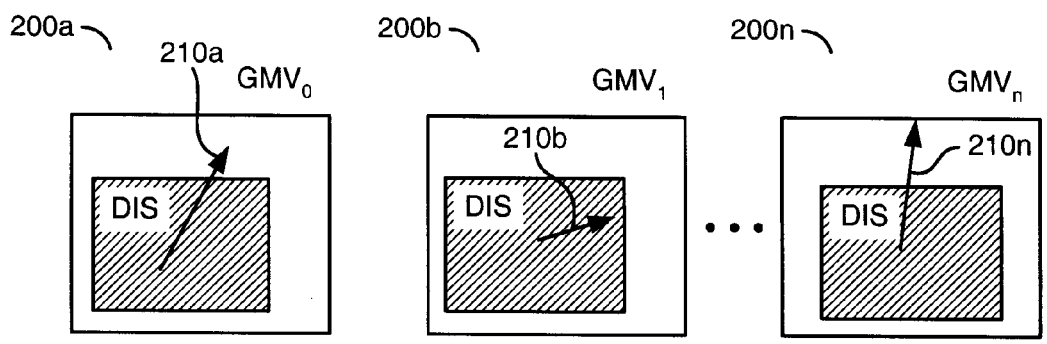
FIG. 7 is a diagram illustrating the global motion vectors from a series of pictures.

Referring to FIG. 7, a diagram is shown illustrating changes in a number of global motion vectors 210a-210n over time. A video sequence containing a number of pictures 200a-200n is shown. For every picture 200a-200n in the video sequence, a succession of global motion vectors 210a-210n is generated in response to the corresponding set of local motion vectors 206a-206n generated for each of the pictures 200a-200n.

Figure 8:
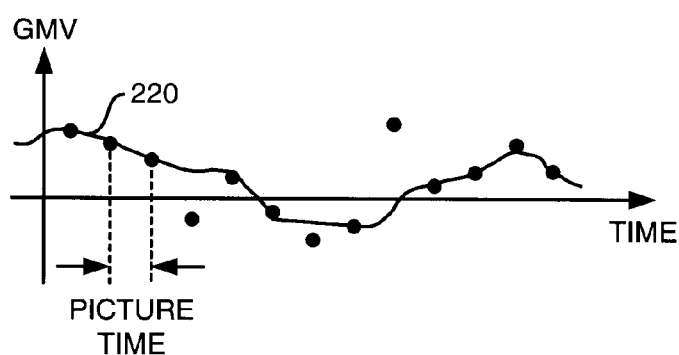
FIG. 8 is a graph illustrating changes in global motion vectors over time.

Referring to FIG. 8, a plot of the computed global motion vectors 210a-210n is shown represented as a time-series for one dimension of each vector. The system 100 may provide temporal processing of motion vectors. For example, the system 100 may smooth out irregularities in the series of global motion vectors 210a-210n to produce stable pictures over time. In one example, a curve fitting process may be used to smooth out the irregularities. For example, a line 220 generally represents an example of a fitted curve for the global motion vectors 210a-210n. In one embodiment, the present invention generally provides a running average of the global motion vectors of 15 consecutive pictures.

In one example, the motion vectors may be processed in such a way as to remove DC components. The AC (varying) components of the global motion vectors may be used to determine the motion shift used to compensate for shaking of the pictures. The system 100 may be used to perform temporal processing, smoothing and prediction through median filtering, clustering, and/or averaging. In addition, a kalman filter predictor may be incorporated as part of the temporal filtering to further stabilize the results.

For example, N processed GMVs 210a-210n may be gathered (e.g., one for each picture 200a-200n). A temporal filtering operation may be performed on the N consecutive GMVs. In one example, the temporal filtering may comprise a temporal averaging of the samples. The value resulting from the temporal averaging constitutes a DC component for the set of N samples. The DC value is removed from the current GMV in proportion using a simple predictor (e.g., convex operation as indicated below, or a kalman filter). In a preferred embodiment a running sum (e.g., accumulator Acc(t)) of the motion vectors may be maintained as each vector is obtained. Maintaining the running sum is equivalent to performing a translational shift with respect to the first frame in the sequence of N samples.

In one example, the convex operation may be implemented according to the following Equation 1:

$$DC(t)=((1-alpha)*DC(t-1))+(alpha*Acc(t)) \quad \text{Eq. 1}$$

A final displacement for time 't' may be expressed by the following Equation 2:

$$GMV\_shift(t)=GMV(t)-DC(t), \quad \text{EQ. 2}$$

where GMV_shift(t) is the actual value used to compensate the picture for stabilization. The goal is that the final shift used to globally compensate for 'shaking' be of zero mean over a period of time.

Figure 9:
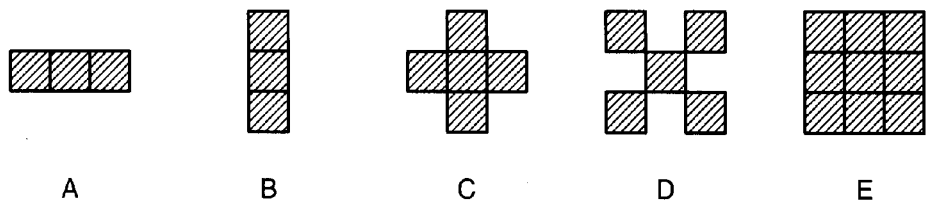
FIGS. 9(A-E) are diagrams illustrating example macroblock arrangements for generating motion vector clusters corresponding to a search window.

Referring to FIGS. 9(A-E), diagrams are shown illustrating example macroblock clusters that may be used to generating a plurality of motion vectors in each search window. A small neighborhood of blocks in a particular location of the picture may be selected. The small neighborhood is generally chosen as adjacent blocks. In one example, a row (FIG. 9A) or column (FIG. 9B) of three blocks may be chosen. In another example, five blocks may be chosen where the blocks are arranged in a '+' pattern (FIG. 9C) or an 'x' pattern (FIG. 9D). In a preferred embodiment, 9 adjacent blocks are chosen. However, other configurations may be implemented to meet the design criteria of a particular implementation. The pre-motion estimator circuit 154 performs motion estimation for each of the neighboring blocks to obtain one motion vector (MV) for each block (e.g., one of the motion vectors 204a-204n discussed above in connection with FIG. 4).

Figure 10:
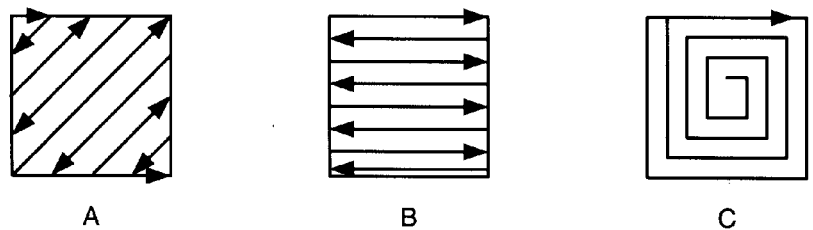
FIGS. 10(A-C) are diagrams illustrating motion vector arrangements for generating a local motion vector corresponding to a search window.

Referring to FIGS. 10(A-C), diagrams are shown illustrating motion vector arrangements that may be used to generate a local motion vector 206 from the plurality of motion vectors 204a-204n. In general, the MVs 204a-204n may be ordered in an arrangement that reduces the entropy between the MVs. In a preferred embodiment, a zig-zag pattern (FIG. 10A) starting at an upper-left corner of the neighborhood and ending in a lower-right corner of the neighborhood may be implemented. The end of the pattern may be wrapped around to the beginning to provide a contiguous set (e.g., a circular buffer) to avoid edge effects in further filtering. However, other configurations such as a reversible scan (FIG. 10B) and a spiral scan (FIG. 10C) may be used.

Figure 11:
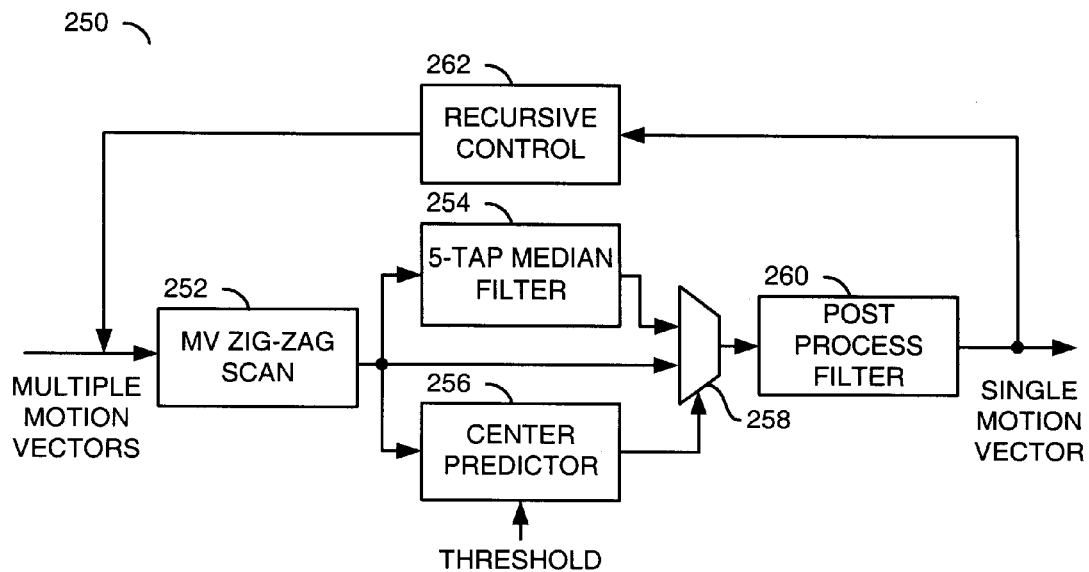
FIG. 11 is a block diagram illustrating a process in accordance with a preferred embodiment of the present invention for generating a local motion vector.

Referring to FIG. 11, a block diagram is shown illustrating a process 250 in accordance with a preferred embodiment of the present invention. The process 250 may be implemented to generate a single motion vector based on multiple motion vectors. In one example, the process 250 may be used to generate a local motion vector (LMV) 206 from a plurality of motion vectors 204a-204n. In another example, the process 250 may be used to generate a global motion vector (GMV) 210 from a plurality of local motion vectors 206a-206n.

The process 250 may comprise a state (circuit) 252, a state (circuit) 254, a state (circuit) 256, a state (circuit) 258, a state (circuit) 260 and a state (circuit) 262. The state 252 may be implemented as a motion vector scanning process. The state 252 may arrange multiple motion vectors by performing a serialization scan (e.g., zig-zag, reversible, spiral, etc.). The state 254 may be implemented as a median filter state. In one example, the state 254 may be implemented as a 5-tap median filter. However, other numbers of taps (e.g., 3, etc.) may be implemented accordingly to meet the design criteria of a particular implementation. The state 256 may be implemented as a center predictor state. The state 258 may be implemented as a multiplexing state. The state 260 may be implemented as a post process filter state. The state 260 generally converts a cluster of motion vectors into a single motion vector. In one example, the conversion may include a linear combination of the motion vectors. In a preferred embodiment, the linear combination may be implemented as an averaging operation of the motion vectors. The state 262 may be implemented as a recursive control state.

The state 252 may receive multiple motion vectors of full-pel or greater (e.g., sub-pel such as half-pel, quarter-pel, eighth-pel, etc.) accuracy. The state 252 may present the motion vectors to an input of the state 254, a first input of the state 256 and a first input of the state 258 in an order that reduces entropy between the multiple motion vectors. The state 254 performs a median filtering operation on the ordered MVs and presents the result to a second input of the state 258. In a preferred embodiment the state 254 uses a 5-tap median filter.

The state 256 receives a threshold value (e.g., THRESHOLD) at a second input and generates a control signal in response to the ordered MVs and the threshold value. The state 256 presents the control signal to a control input of the state 258. The state 258 selects either the output from the state 254 or the ordered MVs from the state 252 for presentation to an input of the state 260 in response to the control signal received from the state 256.

The state 256 performs a post process filtering operation on the output of the state 258. In one example, the post processing operation comprises performing an averaging filter on the MVs received from the state 258. When the multiple motion vectors received by the state 252 comprise motion vectors for a cluster, the state 260 presents a single average MV for the entire cluster (e.g., a local motion vector (LMV) 206). The single average MV generated by the state 260 is presented to an input of the state 262.

When all of the LMVs for each chosen location (e.g., search window) in the picture are obtained, the multiple LMVs may be presented to the input of the state 252 and the process 250 may be performed on the LMVs to generate a global motion vector (GMV) 210 (e.g., a recursive step). The LMVs and GMVs generated by the process 250 may be generated with sub-pel accuracy, even when the input motion vectors presented to the state 252 have only full-pel accuracy. In a preferred embodiment, only full-pel accurate motion vectors are used for generation of LMVs and GMVs in order to reduce computational demands. In general, both local and rough motion vectors may be sub-pel or full-pel accurate, depending upon the design criteria of a particular implementation. The best choice for quality is sub-pel accuracy, because sub-pel accuracy means the reach of the motion vector is between pixels, and therefore more accurate. The best choice for power utilization/processing time is full-pel accuracy, because there are fewer samples to process.

As used here-in 'full' generally means 'not fractional'. For example, in a design with full-pel accurate motion vectors, the motion vectors may be referred to as mv0, mv1, mv2, mv3. In a design with sub-pel accurate motion vectors, for example, quarter-pel, instead of having four vectors as listed above, thirteen vectors would be implemented (e.g., mv0.0, m0.25, mv0.50, mv0.75, mv1.0, mv1.25, mv1.50, . . . , mv2.75, mv3.0). Although the input motion vectors to the stabilization process 250, (e.g., the local MVs and rough MVs) may have only full-pel accuracy, the output of the process 250 (e.g. the LMVs or GMVs) which are computed from local MVs and rough MVs (e.g., as a linear combination of the local MVs and rough MVs), generally have sub-pel accuracy, regardless of the accuracy of the input motion vectors.

Figure 12:
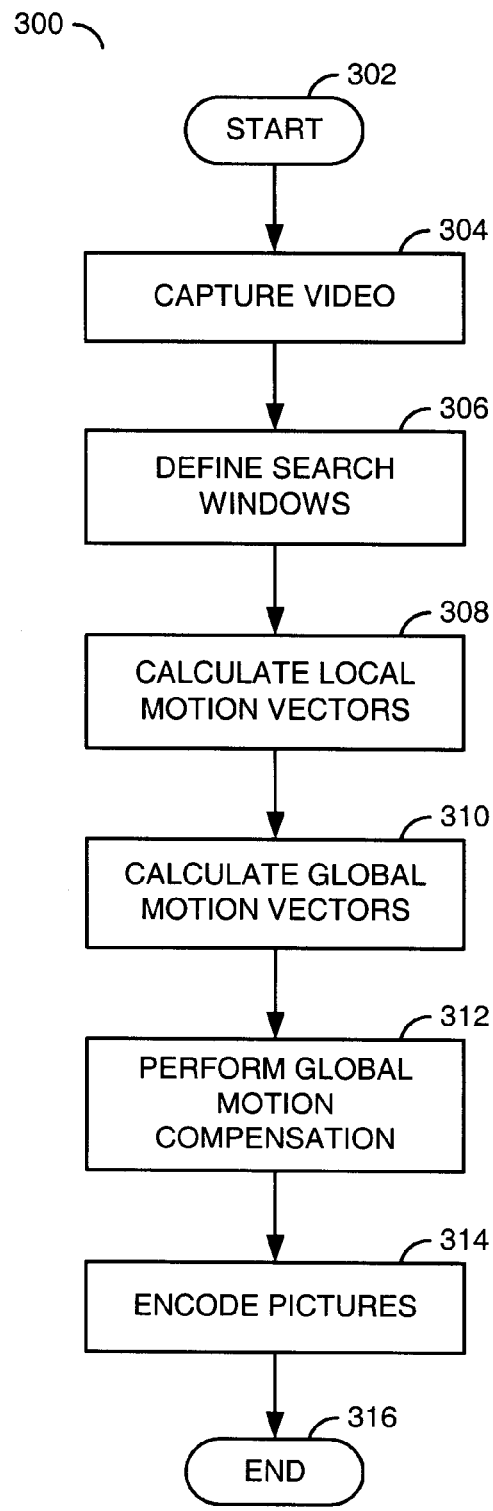
FIG. 12 is a flow diagram illustrating an operation in accordance with the present invention.

Referring to FIG. 12, a flow diagram of a method (or process) 300 in accordance with the present invention is shown. The process 300 generally comprises a state 302, a state 304, a state 306, a state 308, a state 310, a state 312, a state 314 and a state 316. The state 302 may be a start state. The state 316 may be an end state. The state 304 may capture video from the input signal P. The state 304 generally generates a series of sequential frames (or pictures) 200a-200n. Each of the frames 200a-200n may be individually encoded and/or processed. The state 306 defines the search windows 202a-202n. In general, the search windows 202a-202n are defined in each of the frames 200a-200n. The state 308 generally determines the clusters of motion vectors 204a-204n and performs the calculation of the local motion vectors 206a-206n. The state 310 generally generates the global motion vectors 210a-210n in response to the local motion vectors 206a-206n in each of the pictures 200a-200n. For example, a number of local motion vectors 206a-206n for the picture 200a may be used to generate the global motion vector 210a. Another set of local motion vectors 206a-206n for the picture 200b may be used to generate the global motion vector 210b. The state 312 may perform global motion compensation. For example, the state 312 may use the global motion vectors 210a-210n to perform motion compensation (MC) on the frames 200a-200n. The state 314 may encode the pictures 200a-200n into a compressed bitstream.

The global motion vectors 210a-210n may be used to modify (adjust) the particular encoding process (e.g., H.264 or other) implemented. While the method 300 provides a modification to the encoding process, the signal BITSTREAM is generally generated as a compliant bitstream that may be decoded by any compliant decoder (e.g., an H.264 or other decoder).

If the local cluster of blocks chosen to generate the motion vectors is positioned in a flat area of the picture (e.g., an area where there is very little detail) and there is little real motion in the area, the calculation of local motion vectors will produce motion vectors that are not reliable. For example, the difference between the block under processing and the reference block may be very small when an area where there is very little detail and/or little real motion and therefore any block will produce an acceptably low error, which is not indicative of motion.

To ensure reliable motion vectors are generated, image statistics may be obtained from the video preprocessor block 150. The image statistics may include spatial low and high frequency as well as edge information. Given a bandwidth threshold of 0.5 Nyquist, a block that has frequency information below the threshold may be classified as 'low frequency' and a block that has information above the threshold may be classified as 'high frequency'. The average value of all the pixels in the block below and above the bandwidth threshold represents the amount of such feature in the block. Similarly, the output of an edge detector performed on the pixels in the block may be averaged over all the pixels in the block, and the result used as an indication of edge energy in the block.

In one example, a location for the cluster of blocks may be chosen that has more than 10% high frequency, less than 50% of low frequency and strong edges (e.g., more than 5%). If an area of the picture meets the above criteria, the area may be chosen as a possible candidate for clustering. Once all blocks in the picture are examined, the actual areas may be chosen. The decision may be based on system limitations, but experience has shown that nine clusters are sufficient for good results.

In general, an encoder may be made more efficient by receiving a stabilized sequence of pictures. The increased efficiency may be translated into lower power (e.g., fewer computations performed) since the motion estimation range may be lowered for a stabilized picture. The increased efficiency may also be translated into smaller bitstreams since a stabilized sequence may be easier to encode. For example, the stabilized sequence may produce smaller compressed sizes compared to those produced by unstable (shaking or jittery) sequences, while preserving a high level of visual quality. In general, more bits would be used to maintain a high level of visual quality in an unstable sequence than would be used in a sequence stabilized in accordance with the present invention.

Traditional camcorder and DSC companies are likely to include DIS as part of their sensor and image processing pipeline, which are normally not adept at motion estimation processing. Conventional solutions are replete with shortcuts and compromises for the critical global motion estimation process. The system 100 takes advantage of the sophisticated mechanisms for motion estimation in hybrid entropy codecs, and statistical data gathered at various stages of the process for quality refinements. The system 100 may also decouple the global estimation (e.g., rough search) from the refined motion estimation thereby allowing flexible parallel reuse of each module.

The present invention may be used to minimize the cost of image stabilization in an integrated image stabilization processor/video encoder solution by re-using motion estimation designed for video encoding to achieve digital image stabilization. The present invention may be used to provide an effective image stabilization system as part of the normal video coding pipeline that may reduce costs by reusing and repurposing parts of the processing chain.

The present invention may be used in products that may straddle the boundary of image stabilization and video coding. The present invention, by virtue of system on a chip (SOC) integration, may be used in products that integrate image stabilization. The present invention may be used to allow us to a flexible and/or scalable solution for current and future products.

When looking for the best match for a block in the current picture, the proper selection of the starting search position in a reference picture is important to the success of a practical motion estimation process. In order to make a proper selection, a premotion estimator may be implemented to make a rough estimate of the starting position from which to perform a refined motion estimation. The rough estimation may be done in a multiple-pixel domain to obtain an estimate of where to start a refinement. The refined estimation may be made with sub-pel match accuracy and therefore require large amounts of computation. Although it is possible to use only the refined motion estimation, it is more efficient to perform a hierarchical search with a premotion estimator first.

The present invention may be implemented to essentially repurpose the resulting vectors from the premotion estimator to perform image stabilization. When the premotion estimator is configured so that the resulting rough motion vectors favor the co-located block position and are performed so that the cost from distortion is more important than the cost of coding the motion vector, the resulting vector may be used as a facsimile of true motion.

A premotion estimator module for performing rough estimation may be programmed according to the teaching of the present invention to produce localized motion vectors. A control layer may be implemented (e.g., in software, firmware, etc.) to process a plurality of localized premotion estimation vectors to produce a single global motion vector (GMV) for the picture. A plurality of GMVs for a video sequence of pictures may be further processed in accordance with the present invention to produce a stabilization displacement for every picture in the video sequence.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a first circuit configured to generate (i) a first series of sequential frames, (ii) a plurality of local motion vectors for each of said frames, (iii) one or more global motion vectors for each of said frames, (iv) a second series of stabilized sequential frames, (v) a plurality of rough motion vectors and (vi) a digital bitstream in response to (i) a video input signal, wherein the global motion vectors are processed in the temporal domain for the first series of sequential frames, and each of the second series of stabilized sequential frames is generated based on the corresponding global motion vector and the processed global motion vector;
    a second circuit configured to store (i) said first series of sequential frames, (ii) said plurality of local motion vectors, (iii) said one or more global motion vectors, (iv) said second series of stabilized sequential frames and (v) said plurality of rough motion vectors.

2. The apparatus according to claim 1, wherein said first circuit comprises a coding/decoding circuit.

3. The apparatus according to claim 1, wherein said second circuit comprises a memory circuit.

4. The apparatus according to the claim 1, where in said first circuit comprises:
    a video preprocessor configured to generate (i) said first series of sequential frames, (ii) said second series of stabilized sequential frames, (iii) statistics for said first series of sequential frames and (iv) statistics for said second series of stabilized sequential frames.

5. The apparatus according to the claim 4, wherein said first circuit further comprises:
    a pre-motion estimator configured to generate (i) said plurality of local motion vectors and (ii) said plurality of rough motion vectors in response to one or more search window parameters and a control signal.

6. The apparatus according to claim 5, wherein said first circuit further comprises:
    a controller configured to generate (i) said one or more global motion vectors and (ii) said control signal in response to (i) said plurality of local motion vectors, (ii) said plurality of rough motion vectors, (iii) said second series of stabilized sequential frames, (iii) said statistics for said first series of sequential frames and (iv) said statistics for said second series of stabilized sequential frames.

7. The apparatus according to claim 6, wherein said first circuit further comprises:
    an encoder circuit configured to generate said stabilized digital bitstream in response to said second series of stabilized sequential frames.

8. The apparatus according to claim 7, wherein said encoder circuit generates said stabilized digital bitstream in further response to said plurality of rough motion vectors.

9. The apparatus according to claim 8, wherein said controller is further configured to use encoding statistics from said encoder circuit in generating said one or more global motion vectors.

10. The apparatus according to claim 5, wherein said pre-motion estimator comprises:
    a scan module configured to arrange a plurality of motion vectors according to a predetermined order;
    a median filter module configured to filter said motion vectors in said predetermined order;
    a center predictor module configured to generate a control signal in response to (i) said motion vectors in said predetermined order and a threshold value;
    a post process filter configured to generate a single motion vector;
    a multiplexing module configured to select between (i) said motion vectors in said predetermined order and (ii) an output of said median filter module in response to said control signal; and a recursive control module configured to perform a recursive operation with motion vectors generated by said post process filter module.

11. The apparatus according to claim 1, wherein said one or more global motion vectors are generated using a linear combination of said plurality of local motion vectors and said plurality of rough motion vectors.

12. The apparatus according to claim 1, wherein said plurality of local motion vectors and said plurality of rough motion vectors have at least full-pel accuracy and said one or more global motion vectors have a sub-pel accuracy.

13. A method for coding video comprising the steps of:
 (A) capturing an uncompressed video signal to generate a first series of sequential frames;
 (B) defining a plurality of search windows in each of said frames;
 (C) calculating a local motion vector for each of the search windows in each of the frames in response to a plurality of individual motion vectors within each of said frames;
 (D) calculating a global motion vector for each of the frames based on each of said local motion vectors in each of said frames;
 (E) generating a second series of sequential frames in response to (i) each of said global motion vectors and (ii) said first series of sequential frames, wherein the global motion vectors are processed in the temporal domain for the first series of sequential frames, and each of the second series of stabilized sequential frames is generated based on the corresponding global motion vector and the processed global motion vector; and
 (F) generating an encoded bitstream in response to said second series of frames.

14. The method according to claim 13, wherein said coding reduces an effect of camera jitter on said frames.

15. The method according to claim 13, wherein said coding provides image stabilization.

16. The method according to claim 15, wherein a multiple phase scaler is used to provide sub-pel accurate image stabilization.

17. The method according to claim 13, wherein said coding provides more efficient encoding.

18. The method according to claim 13, wherein said plurality of search windows are each programmable within each of said frames.

19. The method according to claim 13, wherein a position of each said plurality of search windows is varied dynamically.

20. The method according to claim 13, wherein steps (C) and (D) comprise a recursive step.

21. The method according to claim 20, wherein said recursive step comprises temporal processing of motion vectors.

22. The method according to claim 13, wherein said plurality of individual motion vectors are generated based on clusters of neighboring macroblocks.

23. An apparatus comprising:
 means for generating (i) a first series of sequential frames, (ii) a second series of stabilized sequential frames, (iii) statistics for said first series of sequential frames and (iv) statistics for said second series of stabilized sequential frames in response to (i) an uncompressed video input signal and (ii) one or more global motion vectors;
 means for generating (i) a plurality of local motion vectors and (ii) a plurality of rough motion vectors in response to one or more search window parameters and a control signal;
 means for generating (i) said one or more global motion vectors and (ii) said control signal in response to (i) said plurality of local motion vectors, (ii) said plurality of rough motion vectors, (iii) said second series of stabilized sequential frames, (iii) said statistics for said first series of sequential frames, (iv) said statistics for said second series of stabilized sequential frames and (v) encoding statistics;
 means for generating a stabilized digital bitstream and said encoding statistics in response to said second series of stabilized sequential frames and said plurality of rough motion vectors, and
wherein the global motion vectors are processed in the temporal domain for the first series of sequential frames, and each of the second series of stabilized sequential frames is generated based on the corresponding global motion vector and the processed global motion vector.

* * * * *